of Patent:

United States Patent
Barlow et al.

(10) Patent No.: US 12,267,110 B2
(45) Date of Patent: Apr. 1, 2025

(54) SYSTEMS AND METHODS FOR PERFORMING TESTS AND MEASUREMENTS USING AN OPTICAL TRANSCEIVER

(71) Applicant: VIAVI SOLUTIONS INC., San Jose, CA (US)

(72) Inventors: Guylain Barlow, Gatineau (CA); Joseph Vogliano, Fairfield, CA (US); Herman Chen, Arlington, VA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 994 days.

(21) Appl. No.: 17/319,855

(22) Filed: May 13, 2021

(65) Prior Publication Data

US 2021/0359762 A1    Nov. 18, 2021

Related U.S. Application Data

(60) Provisional application No. 63/024,274, filed on May 13, 2020.

(51) Int. Cl.
*H04B 10/40*  (2013.01)
*H04B 10/079* (2013.01)

(52) U.S. Cl.
CPC ......... *H04B 10/40* (2013.01); *H04B 10/0793* (2013.01); *H04B 10/07953* (2013.01); *H04B 10/07955* (2013.01); *H04B 10/07957* (2013.01)

(58) Field of Classification Search
CPC ................ H04B 10/40; H04B 10/0793; H04B 10/07953; H04B 10/07955; H04B 10/07957; H04B 10/0795
See application file for complete search history.

(56) References Cited

U.S. PATENT DOCUMENTS 7,711,266 B1 *   5/2010   Harris ................ H04B 10/2569
                                                    398/16

FOREIGN PATENT DOCUMENTS

CN         114221698 A  *  3/2022  ......... H04B 10/0795

* cited by examiner

*Primary Examiner* — Leslie C Pascal
(74) *Attorney, Agent, or Firm* — Mannava & Kang, P.C.

(57) ABSTRACT

A method for providing tests and measurements using a transceiver is disclosed. In some examples, the method may involve using, at least one test instrument and at least one transceiver, to perform tests and measurements at a testing point in a network. The tests and measurements may include at least one of: (1) channel or wavelength and data measurements; (2) insertion loss and optical power measurements; or (3) bit error rate (BER) measurements.

14 Claims, 12 Drawing Sheets

300A

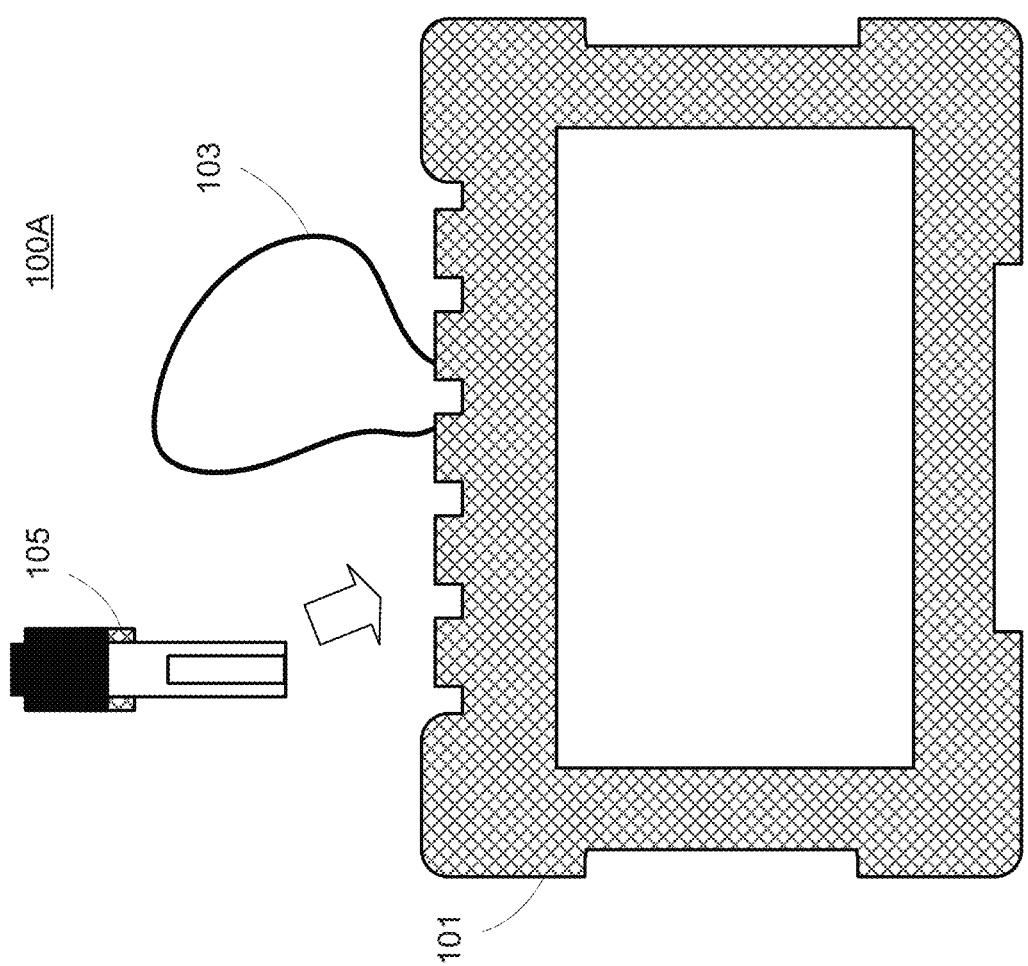

| Scan Results | * | Optical Power | ** | | | | | | |
|---|---|---|---|---|---|---|---|---|---|
| Channel | Upstr. WL (nm) | FET Tx (dBm) | NET Rx (dBm) | Ins. Loss (dB) | Downstr. WL (nm) | NET Tx (dBm) | FET Rx (dBm) | Ins. Loss (dB) | |
| 5 | 1557.20 | 1.2 | -1.7 | 2.9 | 1557.53 | 1.5 | -1.5 | 3.0 | |
| 6 | 1556.39 | 1.1 | -1.4 | 2.5 | 1556.72 | 1.4 | -1.4 | 2.8 | |
| 7 | 1555.59 | 1.2 | -1.7 | 2.9 | 1555.91 | 1.2 | -1.5 | 2.7 | |
| 8 | 1554.78 | 1.3 | -1.7 | 3.0 | 1555.10 | 1.1 | -1.5 | 2.6 | |
| 9 | 1553.97 | 1.2 | -1.6 | 2.8 | 1554.30 | 1.5 | -1.5 | 3.0 | |
| 10 | 1553.17 | 1.3 | -1.7 | 3.0 | 1553.49 | 1.7 | -1.5 | 3.2 | |
| 11 | 1553.23 | 1.4 | -1.7 | 3.1 | 1552.69 | 1.7 | -1.4 | 3.1 | |
| 12 | 1553.15 | 1.5 | -1.6 | 3.1 | 1551.88 | 1.8 | -1.3 | 3.1 | |

Pass     Test Complete

Results Overview | Optical Power (dBm) | DDM

| | |
|---|---|
| Optics/Slot Type: | SFP |
| Signal Presence Test: | Running |
| Optical Signal Level Test: | Running |
| Current PPM Offset: | 0.0 |
| BER Threshold Test: | Running |
| BER | 0.00E+00 |

Pass     Test Complete

Results Overview | Optical Power (dBm) | DDM

| | |
|---|---|
| Optics/Slot Type: | SFP |
| Signal Presence Test: | Running |
| Optical Signal Level Test: | Running |
| Current PPM Offset: | 0.0 |
| BER Threshold Test: | Running |
| Pre-FEC BER (corr + uncorr.): | 4.43E-10 |
| Post-FEC BER (uncorr.): | 0.00E+00 |

┌─────────────────────────────────────────────────────────────┐
│ Identify a test signal in first channel using a transceiver │
│                          801                                │
└─────────────────────────────────────────────────────────────┘
                              │
                              ▼
┌─────────────────────────────────────────────────────────────┐
│   Determine signal power associated with the test signal    │
│                          802                                │
└─────────────────────────────────────────────────────────────┘
                              │
                              ▼
┌─────────────────────────────────────────────────────────────┐
│  Identify one or more open channels near or around the test signal │
│                          803                                │
└─────────────────────────────────────────────────────────────┘

FIG. 8

SYSTEMS AND METHODS FOR PERFORMING TESTS AND MEASUREMENTS USING AN OPTICAL TRANSCEIVER

PRIORITY

This patent application claims priority to U.S. Provisional Patent Application No. 63/024,274, entitled "Systems and Methods for Performing Tests and Measurements using an Optical Transceiver," filed on May 13, 2020, which is hereby incorporated by reference in its entirety.

TECHNICAL FIELD

This patent application is directed to optical measurement instrumentation for telecommunication networks, and more specifically, to systems and methods for performing tests and measurements using an optical transceiver.

BACKGROUND

As telecommunications technologies continue to advance, testing and measuring telecommunication networks and/or elements associated with such networks are becoming more and more important. A transceiver, such as a tunable optical transceiver, may be used to help perform tests and measurements of optical networks.

BRIEF DESCRIPTION OF DRAWINGS

Features of the present disclosure are illustrated by way of example and not limited in the following Figure(s), in which like numerals indicate like elements, in which:

FIG. 1A illustrates a test instrument in a test environment, according to an example;

FIG. 5 illustrates a screen for insertion loss and optical power tests, according to an example;

FIGS. 6A-6C illustrate screens for various bit error rate (BER) tests, according to an example;

FIG. 8 illustrates a flow chart of a method for performing tests and measurements, according to an example.

DETAILED DESCRIPTION

Figure 1B:
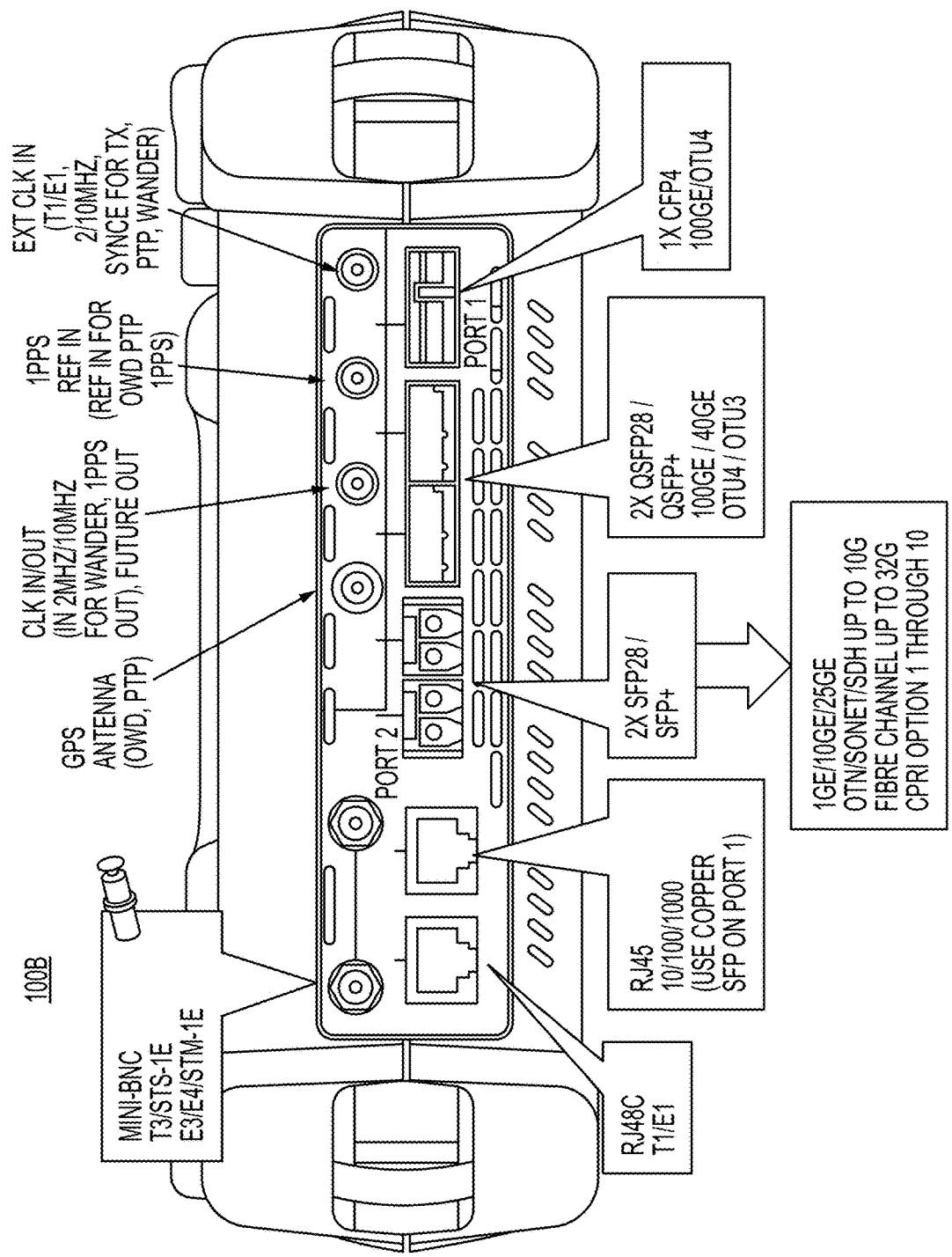
FIG. 1B illustrates an interface of the test instrument of FIG. 1A, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Data centers and various types of networks are expanding all over the world. One of the key trends is the growing importance and evolving landscape of fiber optic technologies enabling new architectures and enhanced levels of performance in data centers and networks. Another key area of expansion includes fiber infrastructure for mobility. As a result, fiber optics is no longer an optional technology, nor is it only reserved for the toughest interconnect problems. Bandwidth, port density, and low-power demands now require fiber optics. For example, 5G, 10G, 25G, 40G, 100G, 200G, and 400G fiber optic products, and beyond, are used to provision the highest bandwidth, highest density, lowest power, and lowest total cost interconnect solutions for optical telecommunications networks.

As fiber optic technologies continue to advance, testing fiber optic networks and/or related products are becoming more and more important. Use of quality of fiber optics products may be important for continued provision of network services and enhanced fiber optic performance. As described above, a transceiver, such as a tunable optical transceiver, may be used to help perform tests and measurements of optical networks.

Finisar® Corporation ("Finisar") has developed T2DOC™ and FlexTune™ products for specific Finisar/II-VI devices. For example, T2DOC™ is a Finisar® interface enabling transceivers at two ends of a fiber optic link to exchange data and execute commands, without affecting high-speed data traffic they carry. Remote transceiver performance monitoring, link transmission optimization, real-time troubleshooting, transceiver security validation are some network applications that T2DOC™ can enable directly at a physical layer level, and that hosts can control via an MSA 2-wire communication.

FlexTune™, for example, is another Finisar® technology that enables automatic configuration and tuning of both tunable transceivers at the two ends of a WDM optical fiber link. With FlexTune™, tunable transceivers on a WDM link can self-tune to the correct wavelength determined by their physical connection to a multiplex/demultiplex (mux/demux) infrastructure, without intervention by the host system or technicians. For instance, a technician can plug the tunable transceiver into a host port on both ends of the link and connect them to any of the optical mux/demux ports, and in this way, the transceiver can automatically determine proper wavelengths to connect to its remote end of the link.

Despite these advantages, the T2DOC™ and FlexTune™ transceiver-related products, when used solely with Finisar® devices, such as specific Finisar/II-IV devices, are limited in their test and measurement functionality. However, when the T2DOC™ and FlexTune™ products are paired or used with other test instruments, such as those offered by Viavi®, including, but not limited to, T-BERD® 5800-100G, ONA-800, NSC-100, or other related devices, etc., they may be further leveraged to perform additional and unique functionalities. For example, these may include any number of additional functionalities associated with service activation and/or maintenance on links in various telecommunication networks. Other various applications and implementations may also be provided. These and other benefits and advantages will be apparent in the examples described below. The T2DOC® and FlexTune™ transceiver-related products, as used herein, may be referred to individually as "T2DOC™ product/interface" or "FlexTune™ configuration/function," respectfully, or collectively as "Finisar® transceiver" or "T2DOC™ and FlexTune™ transceiver." These terms may also be used interchangeably with "transceiver," "optical transceiver," "tunable transceiver," and/or "tunable optical transceiver" in the examples described herein.

It should be appreciated that T2DOC™-enabled products are provided merely as examples of intelligent transceivers. The systems and methods described herein may also apply to any number of Finisar® or non-Finisar® transceivers, which may include, for example, transceivers that are able to exchange data with each other and execute commands when placed at two ends of a fiber optic link without affecting high-speed data traffic they carry. Likewise, it should be appreciated that FlexTune™-enabled products are provided merely as examples of tuning configurations for transceivers. The systems and methods described herein may also apply to any number of Finisar® or non-Finisar® products that enable automatic configuration and tuning of either or both tunable transceivers at the ends of a fiber-optic link. This may include, for example, using any number of settings or configurations to self-tune to the correct wavelength as determined by their physical connection to a network infrastructure, without intervention by a host system or technician.

FIG. 1A illustrates a test instrument 101 in a test environment 100A, according to an example. The test environment 100A may include any number of telecommunication networks. As shown in FIG. 1A, the test instrument 101 may perform any number of tests and measurements. In some examples, the test instrument 101 may perform tests and measurements on an optical cable 103 or an optical (pluggable) transceiver 105. The test instrument 101 may be able to perform any number of network tests in the system environment 100 by generating, transmitting, and/or receiving high-speed signals. In some examples, the test instrument 101 may be a Viavi® test instrument, including, but not limited to, T-BERD® 5800-100G, ONA-800, NSC-100, or other related Viavi or non-Viavi® devices, etc.

As mentioned above, data centers and networks may play a large role in various optical networks. To provision, maintain, and perform tests and measurements for optical network services, any number of transceivers 105 (e.g., tunable optical (pluggable) transceiver) may be used in any server, computer, network element, etc. that is capable of receiving such a transceiver 105. Some transceivers 105 may include, for example, but not limited to, 10G, 25G, 40G, 100G, 200G, and/or 400G optical transceivers, and beyond. These transceivers 105 may be used in data centers and/or networks to support large transmission distances over single or multimode optical fibers, or other link. Furthermore, these transceivers 105 may also increase density and/or reduce power consumption, all of which may be flexibly configured by any host system via a variety of methods or processes. Some of the leading transceiver types may include the following:

CFP1/2/4: C Form Factor Pluggable;
QSFP+: Quad Small Form Factor with 4×N where N(max)~11G;
QSFP28: Quad Small Form Factor with 4×N where N(max)~28G;
QSFP56: Quad Small Form Factor with 4×N where N(max)~56G;
QSFP-DD: Quad small factor double density;
SFP+: Small Form Factor with 1 electrical lane with max rate~11G;
SFP28: Small Form Factor with 1 electrical lane with max rate~28G;
SFP56: Small Form Factor with 1 electrical lane with max rate~56G; and
SFP-DD: Small Form Factor double density.

In some examples, the T2DOC™ and FlexTune™ transceiver from Finisar® may also be used for various tests and measurements, in accordance with at least the examples described herein.

Among other things, the test instrument 101 of FIG. 1A may test network traffic and/or perform other various tests and measurements (e.g., for dark fiber or dark fiber environments). It should be appreciated that, in some examples, performing these and other various tests and measurements described herein may be referred to as Dark Fiber Qual™ or DFQ™. For example, these tests and measurements may include, but not limited to: detecting (e.g., automatically or semi-automatically) available wavelength-division multiplexing (WDM) channels, and identifying, measuring, and/or reporting any number of measurements, such as insertion loss, optical power (e.g., for available wavelengths), data rates settings or capabilities (e.g., for supported pluggable devices), detail information (e.g., digital diagnostic monitoring (DDM) and/or digital optical monitoring (DOM) info), such as temperature, etc. As described herein, these tests and measurements may be performed at both ends of a fiber link, one end of a fiber link, or anything in between. The test instrument 101, for example, may also be used to run bit error rate (BER) tests on available channels, e.g., on 10G, 25G, and so forth. The test instrument 101, for example, may also be used to tune framed Ethernet and/or Common Public Radio Interface (CPRI) traffic in addition to detecting, measuring, and reporting frame loss and/or latency. These and other tests and measurements may also be provided, some of which will be described in more detail herein.

FIG. 1B illustrates an interface 100B of the test instrument 101 of FIG. 1A, according to an example. As shown, the interface 100B (or faceplate) of the test instrument 101 may include any number of elements and/or ports. For example, these may include, but not limited to, the various elements/ports: a mini-BNC, a GPS antenna, a Clk I/O, a PPS Ref In, an Ext Clk I/O, an RJ48c, an RJ45, two SFP28/+, two QSFP28/+, a CFP4, etc. To utilize the T2DOC™ and FlexTune™ transceiver, the SFP28/+ and/or QSFP28/+ ports on the interface 100B of the test instrument 101, for example, may be used. It should be appreciated that these elements/ports are provided simply as examples, and other various and any number of elements or ports may also be provided, added, subtracted, replaced, and/or utilized to perform the various tests and measurements described herein.

Figure 2:
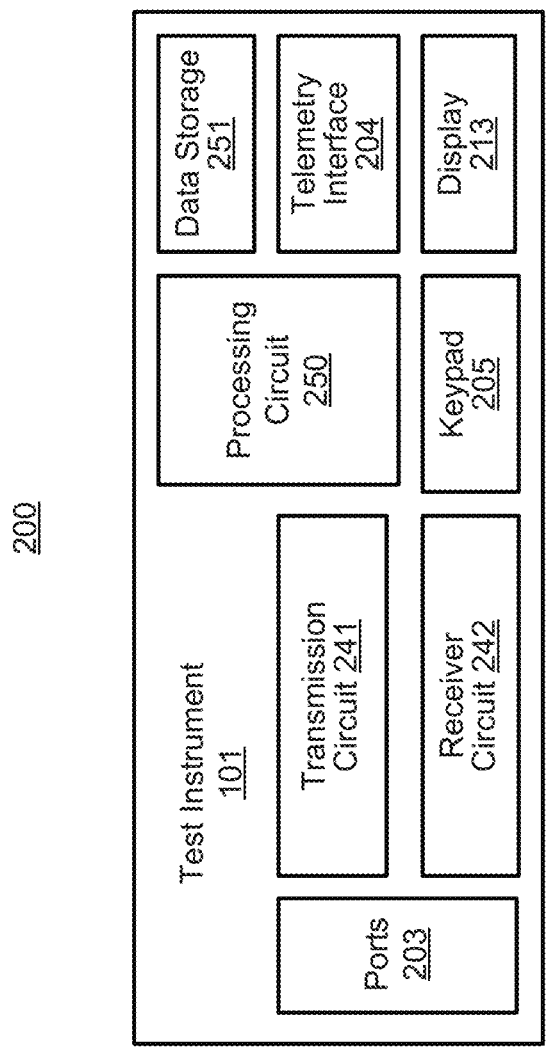
FIG. 2 illustrates a block diagram of a test instrument for performing tests and measurements using a transceiver, according to an example.

FIG. 2 illustrates a block diagram 200 of a test instrument 101 for performing tests and measurements using the transceiver 105, according to an example. The test instrument 101 may include a variety of internal or external components. For instance, the test instrument 101 may be connected to a network (e.g., an optical network) at any desired test point (TP) to measure signals transmitted in the network. In some examples, this may involve using any number of (pluggable) transceivers 105. The test instrument 101 may also include one or more ports 203. In some examples, the ports 203 may be used to connect to one or more test points (TPs). It should be appreciated that these ports 203 may include an adapter interface to test an optical transceiver. In some examples, the ports 203 may include coaxial RF cable connectors, as well as other non-cable ports, for example, to connect to a computer or to an external display, such as, but not exclusively, one or more USB ports, telephone, Ethernet, optical, and the like. These may or may not also include the elements/ports shown and described with respect to the interface 100B of FIG. 1B.

The test instrument 101 may also include a telemetry interface 204 for connecting to a telemetry channel, such as a WiFi interface, Bluetooth interface, cellular interface or another network interface. The telemetry interface 204 may function as an additional communication channel. For example, the test instrument 101 may connect to any number of remote devices via the telemetry interface 204.

It should be appreciated that the test instrument 101 for performing tests and measurements using a transceiver 105 may include a user interface which may include a keypad 205 and display 213. For example, the display 213 may include a touch screen display or other display, such as a liquid crystal display (LCD) or light emitting diode (LED) display. In some examples, a user (e.g., a technician) may interact with the test instrument 101 via the user interface to enter information, select operations, view measurements, examine signal profiles, communicate with other devices, etc.

A data storage 251 may also be found in the test instrument 101. The data storage 251 may store any information used by the test instrument 101 and may include memory or another type of known data storage device. The data storage 251 may store data, power level measurements and/or any other measurements or data used by the test instrument. The data storage 251 may include a non-transitory computer readable medium storing machine-readable instructions executable by processing circuit 250 to perform various actions or operations of the test instrument 101.

A transmission circuit 241 may include a circuit for sending test signals into the network to perform various tests. The transmission circuit 241 may include, among other things, encoders, modulators, and other known component for transmitting signals in the network. A receiver circuit 242 may include components for receiving signals from the network. The transmission circuit 241 and/or the receiver circuit 242 may also include other components, such as a demodulator, a decoder, an ADC, and/or other circuit components or elements.

The processing circuit 250 in the test instrument 101 may include any suitable hardware to perform the operations of the test instrument 101 described herein. The hardware of the test instrument 101, including the processing circuit 250, may include at least one of hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 101 described herein may be performed by the processing circuit 250 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test instrument 101 may also include components other than what is shown.

As mentioned above, the test instrument 101, among other things, may be used for performing any number of tests or measurements for the optical telecommunications network and/or optical products, using the transceiver 105, as described herein. It should be appreciated that various settings may be involved in configuring the test instrument 101 and/or the transceiver 105 to perform the tests and measurements described herein. These settings and configurations, when done appropriately, may help ensure proper operation of these system components. The systems and methods described herein may optimize these settings and configurations for the examples below so that users may be able to perform the tests and measurements in an efficient and expedient manner.

Figure 3A:
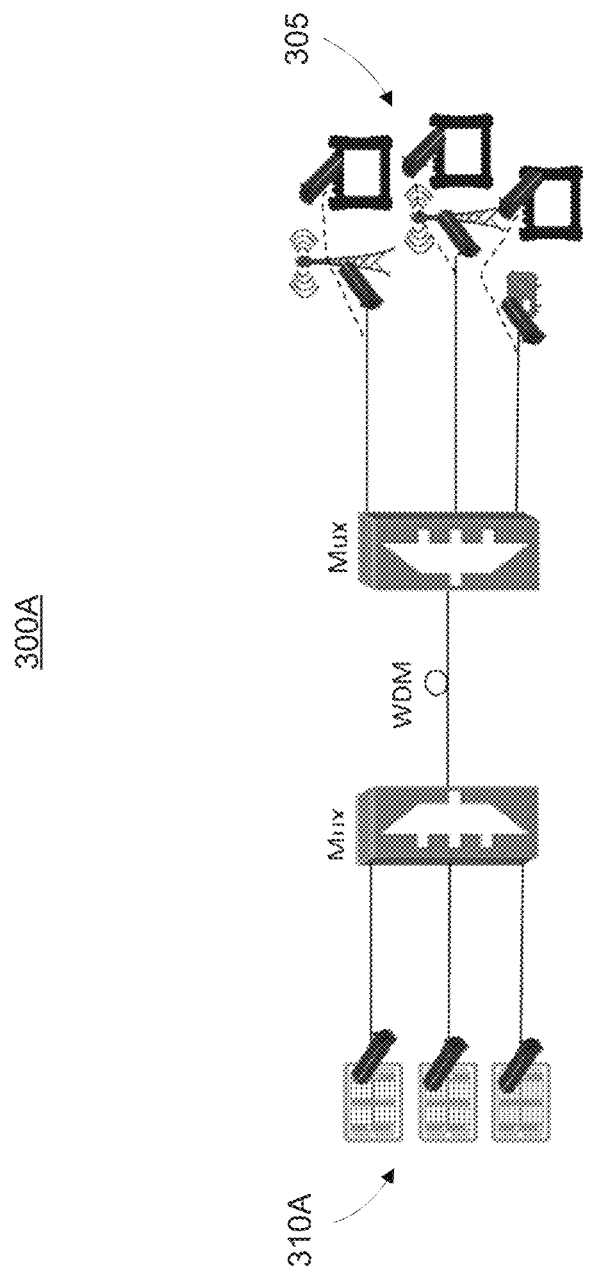
FIGS. 3A-3B illustrate various test and measurement configurations, according to an example.
Figure 3B:
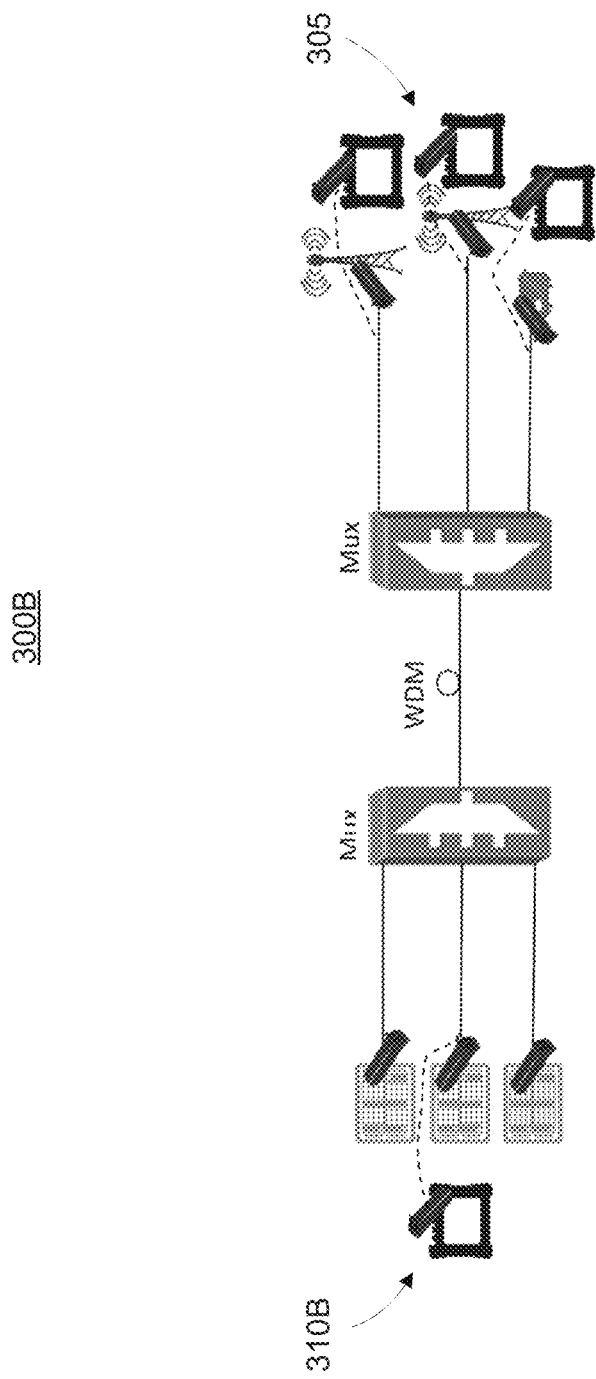

FIGS. 3A-3B illustrate various test and measurement configurations 300A-300B, according to an example. As shown in FIG. 3A, a single-ended testing configuration 300A may be provided. Here, a network may be shown with at least one multiplexer/demultiplexer (mux/demux) and a WDM loop. On one end of the network, there may be a test instrument 101 with a (pluggable) transceiver 105, as shown by 305, and on the other end of the network, there may be a network element with a (pluggable) transceiver 105, as shown by 310A. Because the transceivers 105 on both or either ends may collect data, communicate over the network, and/or work with the test instrument 101, a technician using the test instrument 101 may perform tests and measurements, by plugging the transceiver 105 in an appropriate port of the test instrument 101, on one end of the network as if he or she were performing these tests on both or either end of the network, and/or anywhere in between the transceivers 105. Although the test instrument 101 is depicted in one side of the network, it should be appreciated that the test instrument 101 may be used on either side or both sides of the network as well.

For example, as shown in FIG. 3B, a dual- or double-ended testing configuration 300B may be provided. Here, the network is similar to that shown in FIG. 3A, however, there may be a test instrument 101 with a (pluggable) transceiver 105, as shown by 305, and on the other end of the network, there may be another test instrument 101 with a (pluggable) transceiver 105, as shown by 310B.

As mentioned above, the test instrument 101 may perform any number of tests or measurements. In some examples, the test instrument 101 may perform tests and measurements in a variety of categories. For example, these may include (1) wavelength and data measurements; (2) insertion loss and optical power measurements; and/or (3) bit error rate (BER) measurements. It should be appreciated that the basis for the tests and measurements performed by the test instrument 101 may, for example, be derived from (automatic) detection of which wavelength bands may be available (e.g., in a dark fiber network). Also, by providing a display of available wavelength bands to a user at the test instrument 101, any number of other tests, measurements, or data may also be measured or reported.

In some examples, the (1) wavelength and data measurements may include auto-detection (or near real-time detection) of available wavelength-division multiplexing (WDM) channels. This may include using FlexTune™ in a first channel and finding multiple open channel number(s) around or near the first available channel. In some examples, this may also involve presenting any number of available channels graphically on a display of the test instrument. A summary of potential and exemplary wavelength and data measurements is shown in Table 1 below.

TABLE 1

WAVELENGTH AND DATA MEASUREMENTS

FET SFP Info
May provide the same SFP (small form-factor pluggable) Info as it applies to the FET (Far-End device)
Wavelength Mode
This may provide for automatic available wavelength visibility:
Use FlexTune ™ to find the first available WL (wavelength) and then scan channels and wavelengths across a range in the vicinity of this first available WL
These may be additional possibilities in order to
make wavelength selections
Use FlexTune ™ (Default). Finds the first available WL or channel
Set to a specific channel (leverage the existing tunable laser feature for this where the user can use frequency, wavelength, or channel number to assign a wavelength value.
Wavelength Scan
The user can adjust the range over which the test instrument will scan for channel or wavelength availability.
T2DOC ™ devices for Bidi may support up to 40+ different channels. The max wavelength scan range will likely be limited to contiguous channels. The maximum number of scannable channels may be TBD at this stage
Rx Wavelength
The channel and wavelength values may be provided for both the NET and FET. This is especially important in FlexTune mode.
Available Wavelength Display
From the results obtained above, the user may get a graph of the available wavelengths and potentially control additional functions.

Figure 4A:
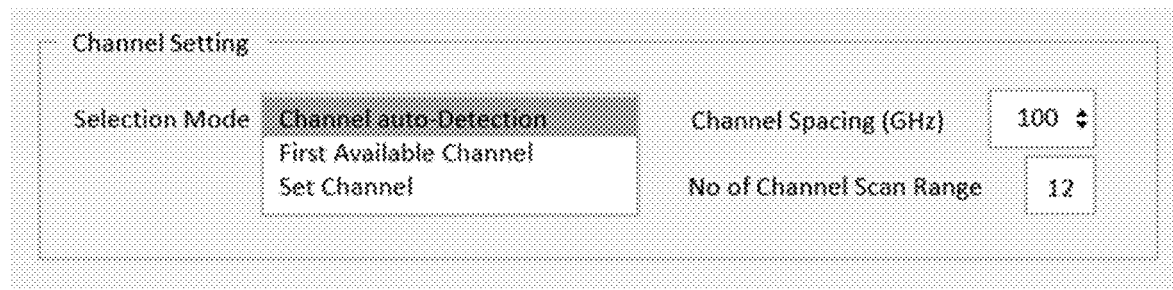
FIGS. 4A-4C illustrates screens for various channel or wavelength tests, according to an example.
Figure 4B:
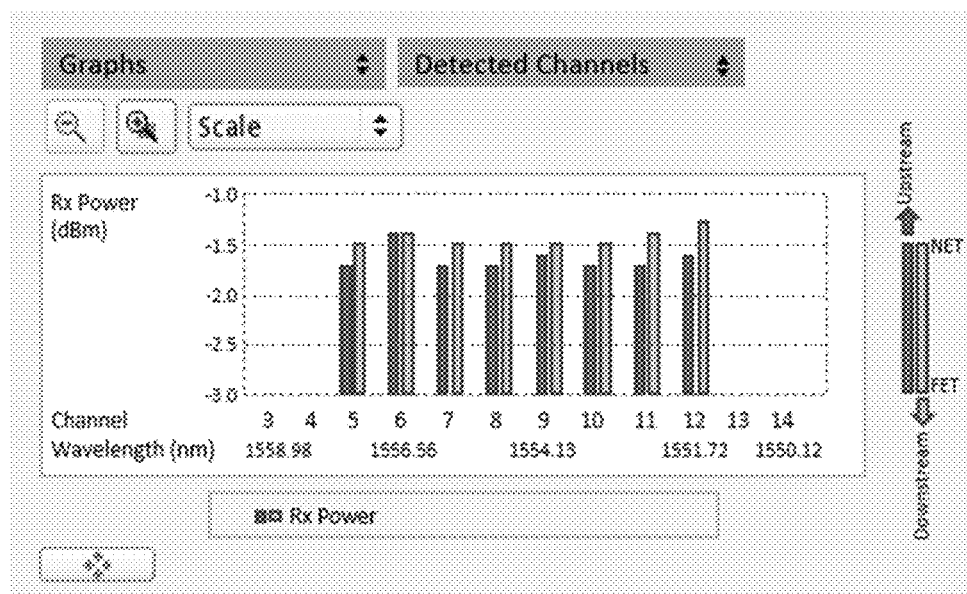
Figure 4C:
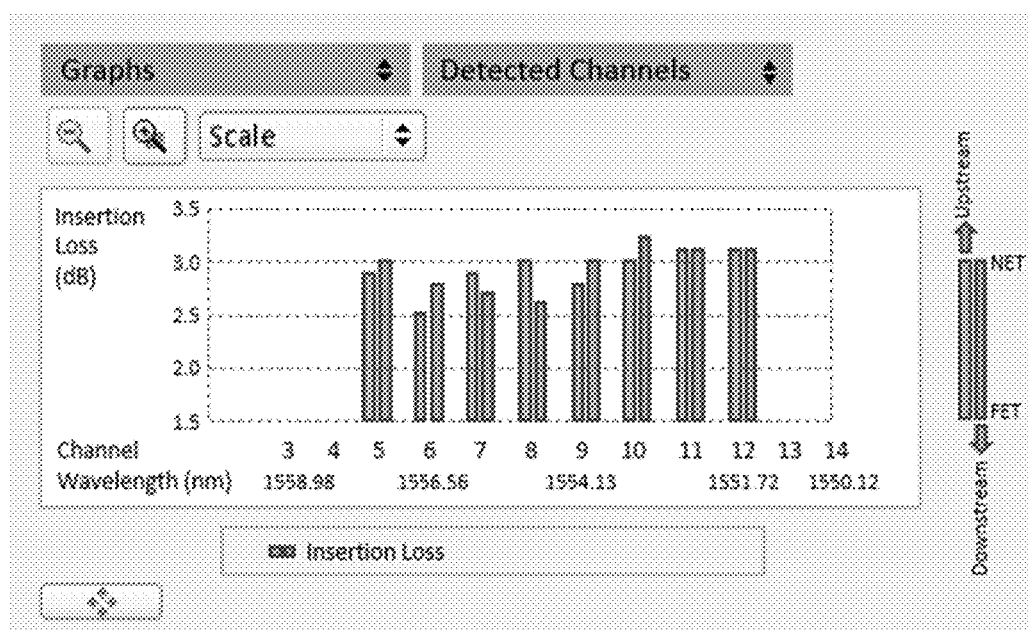

FIGS. 4A-4C illustrates screens 400A, 400B and 400C for various channel or wavelength tests, according to an example. For example, FIG. 4A illustrates a screen 400A for testing and measurements for channel selection and scanning. As shown, a sample channel or wavelength setting may be provided in the screen 400A. FIG. 4B illustrates a screen 400B for available wavelength and optical power (Rx) display. As shown, a sample of channel or wavelength scanning results may be provided in the screen 400B. FIG. 4C illustrates a screen 400C for available wavelength and insertion loss (IL) display (in dB). As shown, a sample of channel or wavelength scanning results may be provided in the screen 400B.

In some examples, (2) insertion loss and optical power measurements may be provided for any number of available channel or wavelengths. This may include measuring other data or reporting graphically on a display of the test instrument 101. A summary of potential and exemplary insertion loss and optical power measurements is shown in Table 2 below.

TABLE 2

INSERTION LOSS AND OPTICAL POWER MEASUREMENTS

Optical Power Reporting
The Tx optical power may be provided for the NET and FET in dBm
The Rx optical power may be provided for the NET and FET in dBm
Insertion Loss Reporting (see example Error! Reference source not found.)
For the NET downstream direction in dB
For the NET upstream direction in dB
Bias Current
The laser bias current for the NET and FET may be provided in mA
Temperature
The pluggable device (transceiver) temperature may be provided in Celsius for the NET and FET
Power leveling
The purpose of this function may be to adjust the amount of transmit power delivered. The following settings shall be available:
No power leveling
Manual adjustment which means signal attenuation adjustments in dB (0, 1, 2, or 3 dB)

TABLE 2-continued

INSERTION LOSS AND OPTICAL POWER MEASUREMENTS

Automatic (or semi-automatic) adjustment. Primarily designed to reduce power against overload
FET Transmitter enable/disable
Provides the possibility of turning the FET laser off/on.

FIG. 5 illustrates a screen 500 for insertion loss and optical power tests, according to an example. As shown, optical power and insertion loss results may be provided in the screen 500.

In some examples, (3) bit error rate (BER) measurements may be provided for available channels. It should be appreciated that measuring bit error rate (BER) performance, which when not conducted properly may be a common reason for network test errors. It should be appreciated that BER performance may typically be based on at least three factors: data rate, confidence level, and BER threshold. In order to address potential network test errors associated with BER performance, the testing techniques described herein may adjust any number of settings or parameters associated with these factors. A summary of potential and exemplary bit error rate (BER) measurements is shown in Table 3 below.

TABLE 3

INTEGRATED BIT ERROR RATE (BER) MEASUREMENTS

Figure 6A:

Rate Capability Reporting
The test instrument may display the maximum and minimum data rate capabiles of the NET and FET
Rate Support
The test instrument may support line rates at both 10 Gbps and 25 Gbps.
Loopback Control
Provides the capability to enable/disable the far-end to enter loopback
Test Time Control
The test instrument may provide the user with an automatic test duration setting based on the target BER objective, Generally, the lower the BER, the more time a test may take based on Bit Error Rate theory. The user may also set the test time manually for a very short test or long-term test
Clock Rate Variations
Clock adjustment ranges allowed by standards such as IEEE 802.3 may be within +/− 100 ppm, The user may set a dock range variation as a sawtooth function with a default range of +/− 100 ppm. This adjustment may take place during the BER test
BER Threshold Setting
The user may set a BER target objective to determine a pass/fail criterion. The recommended default may be $10^{-12}$
25 GE specifics
25 Gigabit Ethernet may be an up-and-coming rate for front-haul transmission which does require the usage of Forward Error Correction (FEC), In this case, the test may be to provide both BER before error correction (pre-FEC) and resulting error rate after error correction (post FEC).
Easy BER test launch
From the wavelength results, the user may directly launch a BER test by simply highlighting a specific wavelength
Error Reporting
The BER test may be able to report any other type of fault found on the line at the bit level
Pass/Fail Results
The BER test may need to be able to provide a pass/fail result based on the performance of the link and circuit
Real-world Conditions
Be able to generate actual Ethernet or CPRI frames like real traffic FIGS. 6A-6C illustrate screens 600A, 600B, and 600C for various bit error rate (BER) tests, according to an example. As shown, a sample of BER parameter setting for 10GE may be provided in the screen 600A. As shown, samples of BER measurement results for 25GE may be provided in screens 600B and 600C. It should be appreciated that, in some examples, eCPRI may use Ethernet interfaces like 10GE and 25GE. That said, the examples described herein may also be compatible with the CPRI rates (those are not Ethernet) as Finisar® or other devices were developed as such. CPRI is a protocol that is frequently used in the front haul for mobility applications. By way of example, CPRI rates under consideration are shown as follows:

| | |
|---|---|
| 614.4 Mbps | CPRI 1 |
| 1228.8 Mbps | CPRI 2 |
| 2457.6 Mbps | CPRI 3 |
| 3072.0 Mbps | CPRI 4 |
| 4915.2 Mbps | CPRI 5 |
| 6144.0 Mbps | CPRI 6 |
| 9830.4 Mbps | CPRI 7 |
| 8110.08 Mbps | CPRI 7a |
| 10137.6 Mbps | CPRI 8 |
| 12165.12 Mbps | CPRI 9 |
| 24330.24 Mbps | CPRI 10 |

It should be appreciated that in some examples, determining the rate capabilities for CPRI usage may also be important.

Figure 7:
FIG. 7 illustrates a screen for test selection, according to an example.

FIG. 7 illustrates a screen 700 for launch point for dark fiber tests and measurements, according to an example. As used herein, dark fiber, may refer to any unused fiber-optic cable or environment. Often times, network providers may lay more lines than what is actually needed in order to curb costs of having to do it again and again. Thus, "dark" strands (from unlit optical fibers) may be leased to individuals or other entities who want to establish optical network connections in locations where these dark fibers reside. Although the systems and methods described herein are directed to various telecommunications networks and environments, dark fiber implementations may be one of the many that may be used.

FIG. 8 illustrates a flow chart of a method for performing tests and measurements at a testing point in a network, according to an example. The method 800 is provided by way of example, as there may be a variety of ways to carry out the method described herein. Although the method 800 is primarily described as being performed by the system 100 of FIG. 1, the method 800 may be executed or otherwise performed by one or more processing components of another system or a combination of systems. Each block shown in FIG. 8 may further represent one or more processes, methods, or subroutines, and one or more of the blocks may include machine readable instructions stored on a non-transitory computer readable medium and executed by a processor or other type of processing circuit to perform one or more operations described herein.

At block 801, a test instrument and/or a transceiver may be used to automatically detect available wavelength channels in a network. In some examples, this may involve identifying a test signal in a first channel using the at least one transceiver.

It should be appreciated that in some examples, the transceiver may be a pluggable to the test instrument via a part. For example, the optical transceiver may include, but not limited to: C Form Factor Pluggable (CFP1/CFP2/CFP4), Quad Small Form Factor Pluggable (QSFP+/QSFP28+/QSFP56/QSFP-DD); and Small Form Factor Pluggable (SFP+/SFP28/SFP56/SFP-DD). In some examples, the transceiver may include a T2DOC™ or Flex-Tune™ transceiver as described herein.

At block 802, the test instrument and/or transceiver may determine signal power associated with the test signal. At block 803, the test instrument and/or transceiver may identify one or more open channels near or around the test signals. In some examples, the tests and measurements may be performed in at least one of a single-ended or a double-ended configuration. In this way, the test instrument and transceiver may be used to test or measure any number of tests or measurements, such as: (1) channel number or wavelength and data measurements; (2) insertion loss and optical power measurements; or (3) bit error rate (BER) measurements described herein.

It should be appreciated that the test instrument 101 and transceivers 105 may provide other various tests and measurements that may or may not be shown above. For example, depending on various configurations and settings, other tests and measurements may also be provided. For example, these may include may use of a pseudorandom binary sequence (PRBS) pattern to help evaluate optical transceiver performance, various compliance tests, which may or may not involve testing and validating pattern sensitivity and crosstalk, stress dynamic skew, jitter, receiver sensitivity, stress communication bus with optics module (MDIO/I2C), etc. It should be appreciated that, in some examples, Viavi® equipment may also use Actema® Test Protocol (ATP) to measure frame loss, out-of-sequence frames, latency, and/or packet jitter. Having optimal test parameters and settings may increase testing efficiencies and minimize expense. Other various tests may also be performed by the test instrument 101 and transceiver 105.

In some examples, some transceivers may require additional adjustments to various settings or parameters. In this scenario, the test instrument 101 may automatically (or semi-automatically) run through one or more custom mode settings. In this way, the test instrument 101 may provide a more granulated way for diagnosing the optical transceiver and potentially isolate problematic issues, which is highly important with high volume of cables and optics that exist in various networks and data centers.

As mentioned above, there may be numerous ways to perform the tests and measurements. Although the description used herein provide may offer one solution, it should be appreciated that these are examples and other various solutions may also be provided.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the systems and methods described herein may facilitate more reliable and accurate tests and measurements, or increase the functionality of, transceivers such as those manufactured by Finisar®. It should also be appreciated that the systems and methods, as described herein, may also involve use of other transceivers or other components not shown or described. For example, these may include external processors, counters, analyzers, computing devices, and other measuring devices, systems, or elements. In some examples, this may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components described herein may be provided as multiple components, and vice versa, to perform the functions and features described herein. It should be appreciated that the components of the systems and methods described herein may operate in partial or full capacity, or it may be multiplied or removed entirely. It should also be appreciated that analytics and processing techniques described herein with respect to the tests and measurements, for example, may also be performed partially or in full by other various components of the overall systems.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems, such as optical telecommunication networks, it should be appreciated that the systems and methods described herein may also be used in other various systems and other implementations. For example, these may include cable, DSL, or other types of telecommunication networks, systems, devices, elements, or components, particularly those that may use any number of (pluggable) transceivers. In fact, there may be numerous other applications in optical communication networks and fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related optical measurements. For example, the systems and methods described herein may allow for a high resolution optical measurements using an efficient and cost-effective design concept and improved compatibilities. Accordingly, the systems and methods described herein may provide mechanical simplicity and adaptability to small or large, as well as exiting test and measurement systems and methods. Ultimately, the systems and methods described herein may increase resolution, minimize complexities, reduce costs, and improve measurement efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method, comprising:
    connecting a test instrument and at least one transceiver to an end of a fiber optic link of a network;
    transmitting, by the at least one transceiver, a test signal in the fiber optic link of the network and receiving, by the test instrument and the at least one transceiver, a return of the test signal in a first channel of the fiber optic link of the network;
    determining, by the test instrument, a signal power associated with the returned test signal;
    identifying, by the test instrument, one or more open channels near or around the first channel that contained the returned test signal; and
    displaying, on a display element of the test instrument, available wavelengths of the one or more open channels near or around the first channel and the signal power associated with the returned test signal.

2. The method of claim 1, wherein the at least one transceiver is plugged into a port of the test instrument.

3. The method of claim 2, wherein the at least one transceiver comprises a T2DOC™ or FlexTune™ transceiver.

4. The method of claim 1, further comprising:
    connecting another transceiver and another end of the fiber optic link of the network, wherein the another transceiver is to receive the test signal from the at least one transceiver and transmit the returned test signal to the at least one transceiver.

5. The method of claim 1, further comprising:
    measuring, by the test instrument, at least one of: insertion loss, temperature, or bit error rate (BER) based on the returned test signal.

6. The method of claim 5, further comprising:
    displaying results from the measuring of at least one of the insertion loss, the temperature, or the BER on the display element of the test instrument.

7. A non-transitory computer-readable storage medium storing instructions, which, when executed by a processor of a test instrument, cause the processor to:
    connect the test instrument and at least one transceiver to an end of a fiber optic link of a network;
    transmit a test signal from the at least one transceiver to the fiber optic link of the network;
    receive, by the test instrument and the at least one transceiver, a return of the test signal in a first channel of the fiber optic link of the network;
    determine, by the test instrument, a signal power associated with the returned test signal;
    identify, by the test instrument, one or more open channels near or around the first channel that contained the returned test signal; and
    display, on a display element of the test instrument, available wavelengths of the one or more open channels near or around the first channel and the signal power associated with the returned test signal.

8. A test instrument, comprising:
    a processor communicatively coupled to at least one transceiver; and
    a memory storing instructions, which when executed by the processor, cause the processor to:
        connect the test instrument and at least one transceiver to an end of a fiber optic link of a network;
        transmit a test signal from the at least one transceiver to the fiber optic link of the network;
        receive, by the test instrument and the at least one transceiver, a return of the test signal in a first channel of the fiber optic link;
        determine, by the test instrument, a signal power associated with the returned test signal;
        identify, by the test instrument, one or more open channels near or around the first channel that contained the returned test signal; and display, on a display element of the test instrument, available wavelengths of the one or more open channels near or around the first channel and the signal power associated with the returned test signal.

9. The test instrument of claim 8, wherein the at least one transceiver is plugged into a port of the test instrument.

10. The test instrument of claim 8, wherein the at least one transceiver comprises a T2DOC™ or FlexTune™ transceiver.

11. The test instrument of claim 8, wherein the instructions further cause the processor to:
connect another transceiver and another end of the fiber optic link of the network, wherein the another transceiver is to receive the test signal from the at least one transceiver and transmit the returned test signal to the at least one transceiver.

12. The test instrument of claim 8, wherein the instructions further cause the processor to:
measure, by the test instrument, at least one of insertion loss, temperature, or bit error rate (BER) based on the returned test signal.

13. The test instrument of claim 12, wherein the instructions further cause the processor to:
display results of the measuring of at least one of the insertion loss, the temperature, or the BER on the display element.

14. The test instrument of claim 8, wherein the display element comprises at least one of a liquid crystal display (LCD), a light emitting diode (LED) display, or a touchscreen display.

* * * * *